United States Patent
Ur

(10) Patent No.: US 9,280,853 B2
(45) Date of Patent: *Mar. 8, 2016

(54) VIRTUAL AND AUGMENTED REALITY

(71) Applicant: Empire Technology Development LLC, Wilmington, DE (US)

(72) Inventor: Shmuel Ur, Galil (IL)

(73) Assignee: Empire Technology Development LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/716,194

(22) Filed: May 19, 2015

(65) Prior Publication Data

US 2015/0254904 A1    Sep. 10, 2015

Related U.S. Application Data

(63) Continuation of application No. 14/239,471, filed as application No. PCT/US2011/059921 on Nov. 9, 2011, now Pat. No. 9,047,700.

(51) Int. Cl.
*G06T 19/00*    (2011.01)
*A63F 13/00*    (2014.01)
*H04N 1/00*    (2006.01)
(Continued)

(52) U.S. Cl.
CPC .............. *G06T 19/006* (2013.01); *A63F 13/00* (2013.01); *A63F 13/34* (2014.09); *A63F 13/65* (2014.09); *H04L 67/38* (2013.01); *H04N 1/00* (2013.01);
(Continued)

(58) Field of Classification Search
CPC ... G06T 19/0006; G06T 19/006; A63F 13/34; A63F 13/65
See application file for complete search history.

(56) References Cited

U.S. PATENT DOCUMENTS 6,917,370 B2    7/2005    Benton
7,564,469 B2    7/2009    Cohen
(Continued)

FOREIGN PATENT DOCUMENTS

JP    2011155584 A    8/2011

OTHER PUBLICATIONS

Cheok, A.D., et al., "Touch-Space: Mixed Reality Game Space Based on Ubiquitous, Tangible, and Social Computing," Personal and Ubiquitous Computing, vol. 6, Issue 5-6, pp. 430-442 (Dec. 2002).
(Continued)

*Primary Examiner* — Corbett B Coburn
(74) *Attorney, Agent, or Firm* — Morritt Hock & Hamroff LLP; Steven S. Rubin, Esq.

(57) ABSTRACT

Technologies are generally described for systems, devices and methods effective to implement virtual and augmented reality. In an example, a first device may send data to a second device. The first device may include a processor and a memory. The processor may receive first image data based on a first real image from a third device. The first real image may include a fourth device image that relates to a fourth device. The processor may receive second image based on a second real image from the fourth device. The processor may send the first image data to the second device. The processor may receive a first request from the second device to receive the second image data. The processor may send a second request to the fourth device for the second image data, receive the second image data, and send the second image data to the second device.

20 Claims, 4 Drawing Sheets

(51) Int. Cl.
*H04L 29/06* (2006.01)
*A63F 13/65* (2014.01)
*A63F 13/34* (2014.01)
*H04N 7/14* (2006.01)

(52) U.S. Cl.
CPC .... *H04N 1/00347* (2013.01); *A63F 2300/8082* (2013.01); *H04N 7/147* (2013.01)

(56) References Cited

U.S. PATENT DOCUMENTS

| | | | |
|---|---|---|---|
| 7,796,155 | B1 | 9/2010 | Neely, III et al. |
| 7,822,607 | B2 | 10/2010 | Aoki et al. |
| 9,047,700 | B2 * | 6/2015 | Ur |
| 2008/0215434 | A1 | 9/2008 | Jung et al. |
| 2010/0257252 | A1 * | 10/2010 | Dougherty et al. ........... 709/217 |
| 2011/0216060 | A1 | 9/2011 | Weising et al. |
| 2011/0237331 | A1 * | 9/2011 | Doucet et al. ................. 463/32 |
| 2011/0238751 | A1 | 9/2011 | Belimpasakis et al. |
| 2012/0007852 | A1 * | 1/2012 | Morate et al. ................ 345/419 |
| 2012/0108332 | A1 * | 5/2012 | Baseley et al. ................ 463/31 |

OTHER PUBLICATIONS

Henri, "Remote Augmented Reality Prototype," Visual Experiments, accessed at http://web.archive.org/web/20111104031937/http://www.visual-experiments.com/2010/07/11/remote-augmented-reality-prototype/, posted on Jul. 11, 2010, pp. 3.

International Search Report and Written Opinion for International Patent Application No. PCT/US2011/059921, mailed Mar. 4, 2014, 9 pages.

Leung, D.C-M., et al., "Remote Augmented Reality for Multiple Players Over Network," Proceedings of the International Conference on Advances in Computer Entertainment Technology, pp. 220-223 (Jun. 13-15, 2007).

* cited by examiner

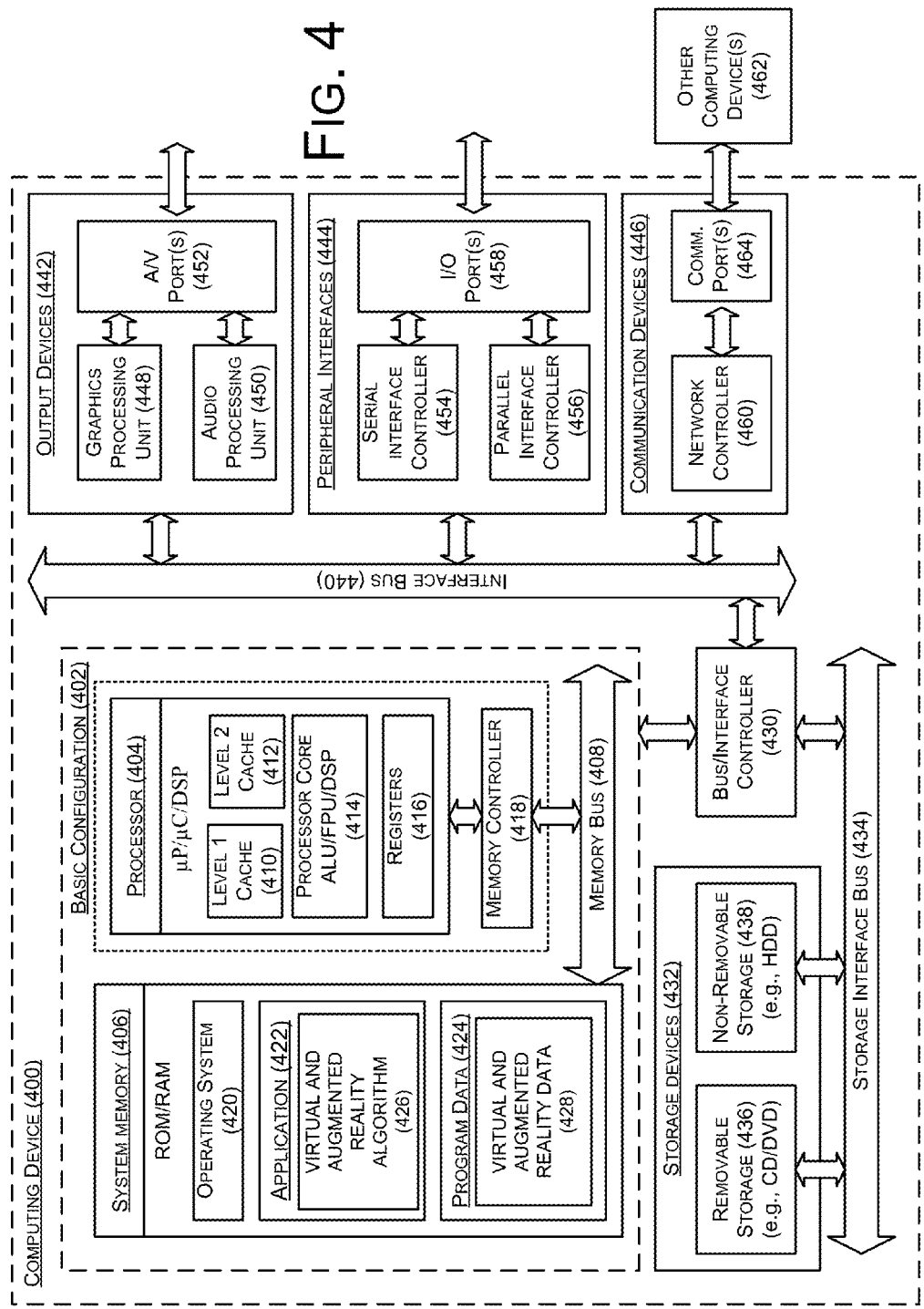

VIRTUAL AND AUGMENTED REALITY

CROSS-REFERENCE TO RELATED APPLICATIONS

This Application is a continuation under 35 U.S.C. §120 of U.S. Pat. No. 9,047,700, corresponding to U.S. application Ser. No. 14/239,471, filed on Feb. 18, 2014, which in turn is a national stage filing under 35 U.S.C. §371 of International Application Ser. No. PCT/US11/59921 filed on Nov. 9, 2011. The disclosure of U.S. Pat. No. 9,047,700, U.S. application Ser. No. 14/239,471 and PCT/US11/59921 are incorporated herein by reference in its entirety.

BACKGROUND

Unless otherwise indicated herein, the materials described in this section are not prior art to the claims in this application and are not admitted to be prior art by inclusion in this section.

In a virtual reality game, a processor may display images to a user that may have little to no relation to the real world. Augmented reality may use the real world as a background and add a layer of augmented information. A sensor device may capture real image information and then change that information by adding additional information about the real world image. For example, an image of a real building may be displayed as an image of a Victorian era building.

SUMMARY

In one example, a system effective to output data is generally described. The system may include a first device, a second device, a third device, and a processor in communication with the first, second, and third devices. The first device may be effective to receive first real image input of a first real image. The first real image may include a second device image that relates to the second device. The first device may be further effective to convert the first real image input into first image data. The first device may be further effective to send the first image data to the processor. The second device may be effective to receive second real image input of a second real image. The second device may be effective to convert the second real image input into second image data. The second device may be further effective to send the second image data to the processor. The processor may be further effective to send the first image data to the third device. The processor may be further effective to receive a first request from the third device to receive the second image data from the second device. The processor may be further effective to send a second request to the second device for the second image data. The processor may be further effective to receive the second image data. The processor may be further effective to send the second image data to the third device. The third device may be further effective to receive and output the second image data.

In one example, a first device effective to send data to a second device is generally described. The first device may include a processor and a memory in communication with the processor. The processor may be effective to receive first image data from a third device. The first image data may be based on a first real image. The first real image may include a fourth device image that relates to a fourth device. The processor may be effective to receive second image data from the fourth device. The second image data may be based on a second real image. The processor may be effective to send the first image data to the second device. The processor may be further effective to receive a first request from the second device to receive the second image data from the fourth device. The processor may be further effective to send a second request to the fourth device for the second image data. The processor may be effective to receive the second image data. The processor may be effective to send the second image data to the second device.

In one example, a method for sending data from a first device to a second device is generally described. The method may include receiving, by the first device, first image data from a third device. The first image data may be based on a first real image. The first real image may include a fourth device image that relates to a fourth device. The method may further include receiving, by the first device, second image data from the fourth device. The second image data may be based on a second real image. The method may further include sending, by the first device, the first image data to the second device. The method may further include receiving, by the first device, a first request from the second device to receive the second image data from the fourth device. The method may further include sending, by the first device, a second request to the fourth device for the second image data. The method may further include receiving, by the first device, the second image data. The method may further include sending, by the first device, the second image data to the second device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4 is a block diagram illustrating an example computing device that is arranged to implement virtual and augmented reality;

Figure 1:
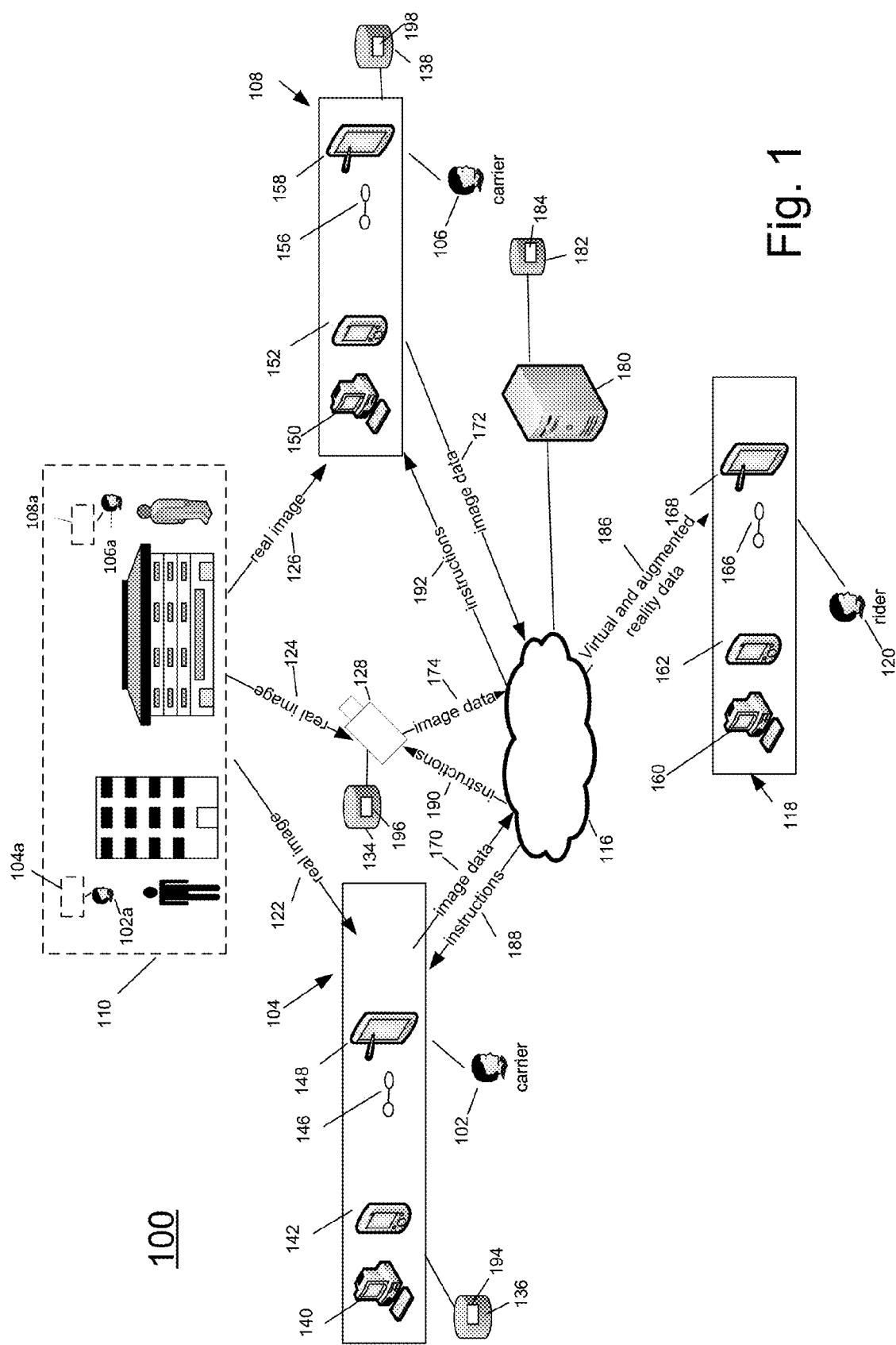
FIG. 1 illustrates some example systems that can be utilized to implement virtual and augmented reality.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementing virtual and augmented reality.

Briefly stated, technologies are generally described for systems, devices and methods effective to implement virtual and augmented reality. In an example, a first device may send data to a second device. The first device may include a processor and a memory. The processor may receive first image data based on a first real image from a third device. The first real image may include a fourth device image that relates to a fourth device. The processor may receive second image based on a second real image from the fourth device. The processor may send the first image data to the second device. The processor may receive a first request from the second device to receive the second image data. The processor may send a second request to the fourth device for the second image data, receive the second image data, and send the second image data to the second device.

FIG. 1 illustrates some example systems that can be utilized to implement virtual and augmented reality in accordance with at least some embodiments described herein. As discussed in more detail below, in some examples, a system 100 may include one or more carrier devices 104, 108, a sensor 128, a processor 180 and/or a rider device 118 all in communication over a network 116. In some examples, network 116 may be or include the Internet network or a cellular network. In some examples, network 116 may be or include a local area network and/or a wide area network.

In summary, carrier devices 104, 108 and sensor device 128 may be configured to receive data such as real image inputs 122, 124, 126 from a real image 110. Carrier devices 104, 108 and sensor device 128 may be configured to convert real image inputs 122, 126, 126 into image data 170, 174, 172 and send image data 170, 174, 172 over network 116. Processor 180 may send instructions 188, 190, 192 over network 116 to augment image data 170, 174, 172 with augmented reality data 194, 196, 198. Processor 180 may be configured to receive image data 170, 174, 172 and generate virtual and augmented reality data 186 to be output by rider device 118.

In some examples, first carrier device 104 could be a computer 140, a cell phone 142, a computer generated reality device 146, and/or a tablet computer 148, etc. First carrier device 104 may be in communication with a memory 136 configured to store data 194. Similarly, in some examples, second carrier device 108 could be a computer 150, a cell phone 152, a computer generated reality device 156, and/or a tablet computer 158, etc. Second carrier device 106 may be in communication with a memory 138 configured to store data 198. Rider device 118 could be a computer 160, a cell phone 162, a computer generated reality device 166, and/or a tablet computer 168, etc. Sensor 128 could be a camera such as a static internet camera, security camera, etc. Sensor 128 may be in communication with a memory 134 configured to store data 196.

Carrier device 104 may be configured to receive data such as real image input 122 from a real image 110. Real image 110 may include, for example, buildings, people, scenery etc. Real image 110 may include images relating to carrier devices 104, 108 such as images of a carrier device 104a, a carrier user 102a, a carrier device 108a and/or a carrier user 106a. Similarly, carrier device 108 may be configured to receive data such as real image input 126 from a real image 110. Sensor device 128 may be configured to receive real image input 124.

First carrier device 104 may convert real image input 122 into image data 170 and send image data 170 over network 116 to processor 180. Image data 170 may be based on real image input 122 and may be augmented with augmented reality data 194. For example, augmented reality data 194 may be provided from memory 136 and/or from instructions 188 sent from processor 180.

Similarly, second carrier device 108 may convert real image input 126 into image data 172 and forward image data 172 over network 116 to processor 180. Image data 172 may be based on real image input 126 and may be augmented with augmented reality data 198. For example, augmented reality data 198 may be provided from memory 138 and/or from instructions 192 sent from processor 180.

Sensor 128 may convert real image input 124 into image data 174 and send image data 174 over network 116 to processor 180. Image data 174 may be based on real image input 124 and may be augmented with augmented reality data 196. For example, augmented reality data 196 may be provided from memory 134 and/or from instructions 190 sent from processor 180.

Processor 180 may receive and combine image data 170, 174, 172 with additional data based on instructions 184 in memory 182 to produce virtual and augmented reality data 186. Image data 170, 174, 172 may also include information regarding a location of carrier devices 104, 108 and sensor device 128. Processor 180 may send virtual and augmented reality data 186 to rider device 138. Rider device 138 may output virtual and augmented reality data 186 such as by display on a screen.

A rider user 120 may be in communication with rider device 118. Similarly, carrier users 102, 106 may be in communication with carrier devices 104, 106 respectively. Rider users 120 may be able to communicate with carrier devices 104, 106 such as through respective interfaces like microphones and speakers on rider device 118 and carrier devices 104, 106. Similarly, rider users 120 may be able to communicate with other rider users receiving data from the same carrier device. For example, a first rider device may send audio data through network 116 to be output on a speaker of a first carrier device. A speaker in the first carrier device may output the audio data and a microphone in the first carrier device may receive and forward the audio data to another rider device.

Among other potential benefits, a system in accordance with the disclosure may be able to provide users with unique experiences. For example, a user may be provided with an experience where a virtual world is different from the real world. Images of real people may be augmented to look like vampires, fairies, etc. Network cloud based games may be implemented.

In an example, one or more rider devices 120 may "ride" on one or more carrier devices 104, 108 so that rider users may be able to see images received by carrier devices. Processor 180 may send virtual and augmented reality data 186 to rider device 118 that is based on at least some of the image data 170, 172, 174 from carrier devices 104, 108 or sensor device 128. Carrier devices 104, 108 may be used to receive real images 122, 126 and a location of carrier devices 104, 108 may be changed by carrier users 102, 106 respectively. Carrier users can thus move around in the real world, and rider users can see what the carrier users or devices see. Users 102, 106 may or may not be part of an experience designated by instructions 184. For example, carrier users 102, 106 may be compensated to change locations of their respective devices to receive changing real image input 122, 126. Carrier users may be paid to move around and receive images in different places so that rider users can see what the carrier users see.

In an example, a rider user 120 may desire to see a city where a carrier user 102 and the carrier user device 104 are located. In this example, rider user 120 may generate a request at rider device 118 and send the request to processor 180 requesting data from a carrier device at a particular location. Rider user 120 may be able to see on rider device 118 image data 170 sent by carrier device 104. In an example, a rider user may send a request to a processor to see images in New Zealand. The processor may connect the rider user with a carrier device in New Zealand and the rider user can then see images of New Zealand.

Real image input 122, 124, 126 may include images relating to other carrier devices or carrier users. For example, first carrier device 104 may be able to receive real image input 122 which may include an image of second carrier device 108a in real image 110. Rider users may be able to see images of other rider users or carrier users. Instructions 184 may allow rider device 118 to receive image data 172 from second carrier device 108. Rider user 120 can effectively jump from one carrier device to another carrier device. A rider user may thus see an image another carrier device and request to receive images from that other carrier device. For example, instructions 184 may allow user device 118 receiving image data from first carrier device 104 to request and receive image data from second carrier device 108 that is within a defined physical distance from first carrier device 104. For example, the physical distance may be 5 yards. Alternatively, instructions 184 may allow user device 118 receiving image data from first carrier device 104 to request and receive image data from second carrier device 108 that is across the world.

In an example relating to a game, image data 170 including images of carrier devices 108a or carrier users 106a may be augmented to change their appearance. For example, at first carrier device 104, image data including carrier user 106a and/or second carrier device 108a may be augmented to look like first carrier user 106, augmented to have features relating to a vampire and have whiter hue or may have robes to look like a wizard, a horse to ride, etc. In this way, instead of seeing other user images, rider user 120 may see augmented user images. Rider users may thus be provided with augmented reality images related to real world images. Images of people may be augmented to look like vampires or magicians. A carrier user may look like a horse.

In an example, rider users may choose to play a game of tag where rider users jump or receive input from a series of carrier devices. A first rider user may be a "prey" and may send a picture of a real location to a "hunter" rider user. The "hunter" could then attempt to locate a carrier device proximate to the real location of the prey rider user. Image input, including images of carrier users and/or carrier devices, received by other carrier devices may be augmented such as changing an appearance of the carrier users look like a cat and/or a mouse. Rider users may be able to request and receive image data from carrier devices that are within a certain predefined distance from a currently used carrier device. A first rider user may win the game if the first rider user requests to receive data from the same carrier device as a second rider user.

Real image 110 may be augmented, either through augmentation by carrier devices 104, 108 or processor 180 to look like a masquerade party. In this example, image data relating to carrier users 102, 106 may be further augmented to look like they are wearing a costume. Carrier user 102 may allow rider users 120 to receive data relating to an interesting party.

A rider user may request a carrier user to find or view something in real image 110 such as finding information hidden under a real world rock. In another example, a number of rider users receiving data from a single carrier device may affect the ability of the carrier device to augment image data 170. For example, rider users may be thought of as "souls" and more souls allows different types of augmentation such as creating images relating to a stronger wizard or different spell power.

In an example, a rider user 120 may desire to see additional information in a city where carrier device 104 is located. For example, rider user 120 may work with a news agency or wish to sightsee. Carrier user 102 may be compensated to change a location of carrier device 104 to receive certain real images 110. In these examples, an appearance of carrier user 102 may be augmented to look like a horse.

Figure 2:
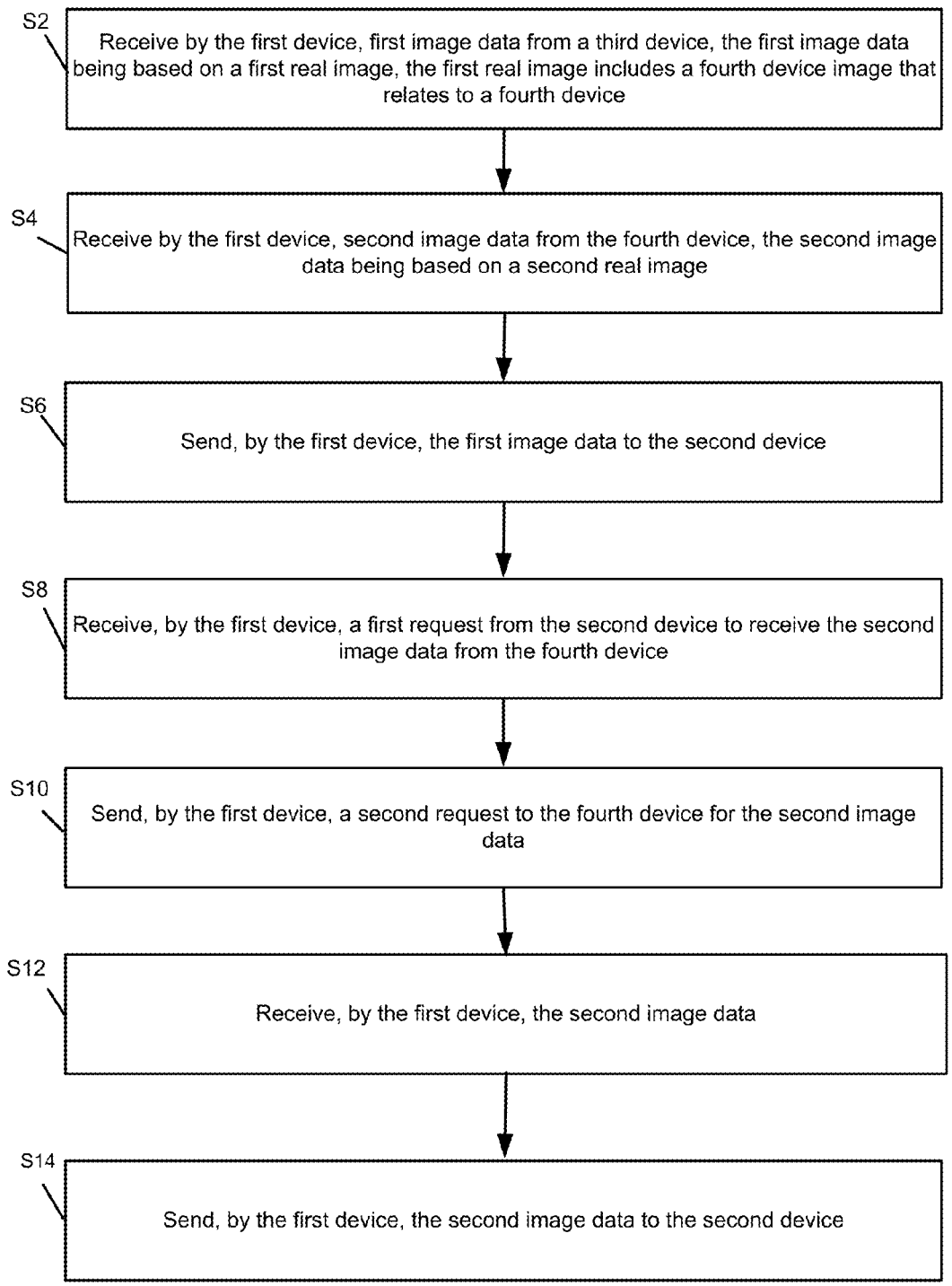
FIG. 2 depicts a flow diagram for example processes for implementing virtual and augmented reality.

FIG. 2 depicts a flow diagram for example processes for implementing virtual and augmented reality in accordance with at least some embodiments described herein. The process in FIG. 2 could be implemented using, for example, system 100 discussed above. An example process of a method for sending data from a first device to a second device may include one or more operations, actions, or functions as illustrated by one or more of blocks S2, S4, S6, S8, S10, S12 and/or S14. Although illustrated as discrete blocks, various blocks may be divided into additional blocks, combined into fewer blocks, or eliminated, depending on the desired implementation. Processing may begin at block S2.

At block S2, a first device may receive first image data from a third device. The first image data may be based on a first real image. The first real image may include includes a fourth device image that relates to a fourth device. Processing may continue from block S2 to block S4.

At block S4, the first device may receive second image data from the fourth device. The second image data may be based on a second real image. Processing may continue from block S4 to block S6.

At block S6, the first device may send the first image data to the second device. Processing may continue from block S6 to block S8.

At block S8, the first device may receive a first request from the second device to receive the second image data from the fourth device. Processing may continue from block S8 to block S10.

At block S10, the first device may send a second request to the fourth device for the second image data. Processing may continue from block S10 to block S12.

At block S12, the first device may receive the second image data. Processing may continue from block S12 to block S14.

At block S14, the first device may send the second image data to the second device.

Figure 3:
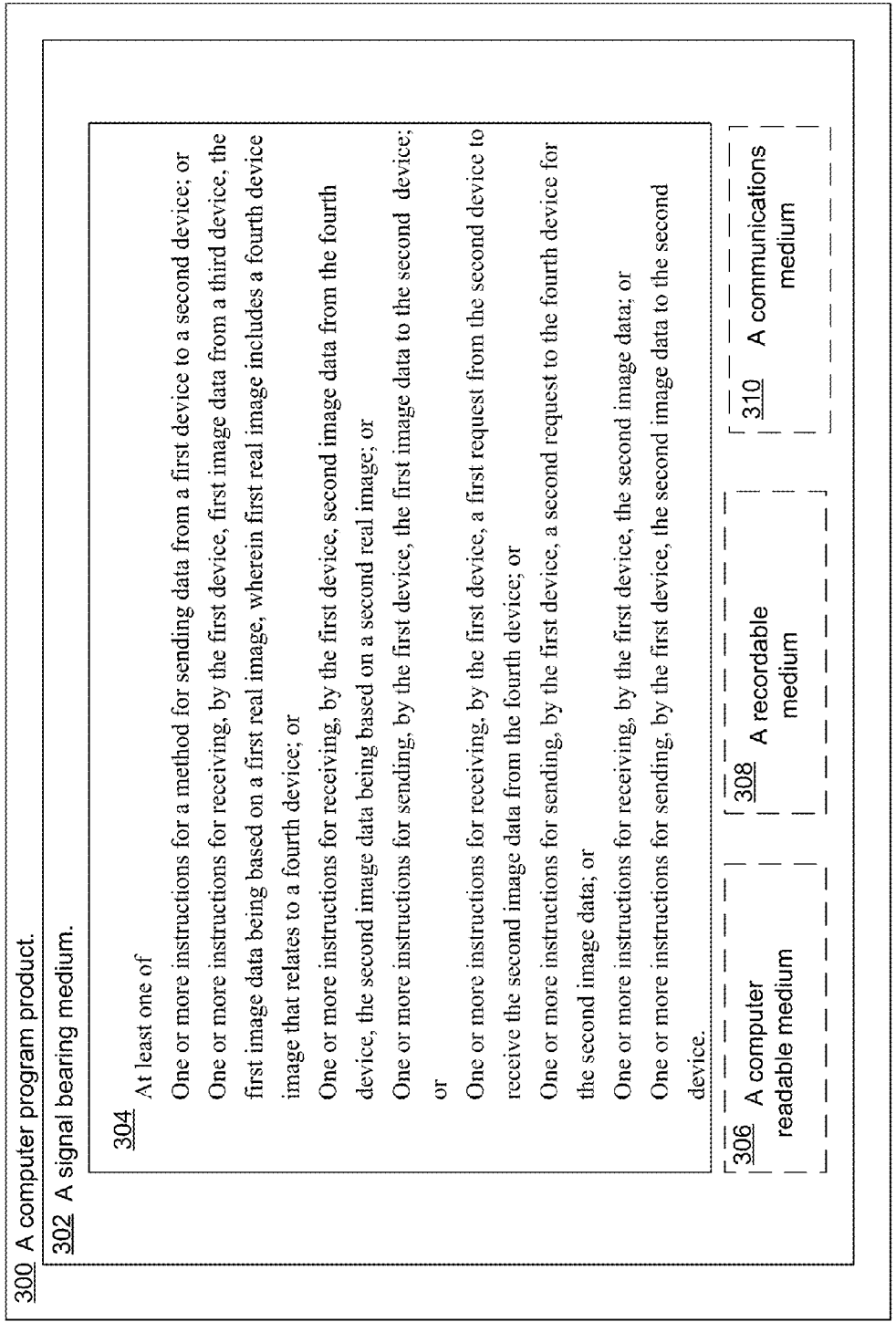
FIG. 3 illustrates computer program products effective to implement virtual and augmented reality.

FIG. 3 illustrates computer program products 300 effective to implement virtual and augmented reality in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, one or more of carrier device 104, carrier device 108, rider device 118, and/or processor 180 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 4 is a block diagram illustrating an example computing device 400 that is arranged to implement virtual and augmented reality arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a virtual and augmented reality algorithm 426 that is arranged to perform the functions as described herein including those described previously with respect to FIGS. 1-3. Program data 424 may include virtual and augmented reality data 428 that may be useful for implementing virtual and augmented reality as is described herein. In some embodiments, application 422 may be arranged to operate with program data 424 on operating system 420 such that implementing virtual and augmented reality may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A first device effective to send data to a second device, the first device comprising:
   a processor; and
   a memory configured to be in communication with the processor;
   wherein the processor is effective to:
      receive first image data from a third device, the first image data being based on a first real image, wherein the first real image includes a fourth device image that relates to a fourth device;
      send the first image data to the second device;
      send a request to the fourth device to receive second image data;
      receive the second image data from the fourth device, the second image data being based on a second real image; and
      send the second image data to the second device.

2. The device as recited in claim 1, wherein the processor is effective to augment the second image data to change an appearance of the second real image.

3. The device as recited in claim 1, wherein the processor is effective to augment the first image data to change an appearance of the first real image.

4. The device as recited in claim 1, wherein the processor is further effective to:
   receive audio data from the second device; and
   forward the audio data to the fourth device.

5. The device as recited in claim 1, wherein the processor is further effective to:
   receive audio data from the fourth device; and
   forward the audio data to the second device.

6. The device as recited in claim 1, wherein the processor is effective to augment the second image data based on instructions stored in the memory.

7. The device as recited in claim 1, wherein the processor is effective to augment the fourth device image in the first real image based on instructions stored in the memory.

8. The device as recited in claim 1, wherein the fourth device image is a first fourth device image, the second real image includes a second fourth device image that relates to the fourth device, and the processor is effective to augment the second fourth device image to change an appearance of the second fourth device image.

9. The device as recited in claim 1, wherein the processor is effective to augment the first image data based on instructions stored in the memory.

10. A method for sending data from a first device to a second device, the method comprising:
- receiving, by the first device, first image data from a third device, the first image data being based on a first real image, wherein first real image includes a fourth device image that relates to a fourth device;
- sending, by the first device, the first image data to the second device;
- sending, by the first device, a request to the fourth device to receive second image data;
- receiving, by the first device, the second image data from the fourth device, the second image data being based on a second real image; and
- sending, by the first device, the second image data to the second device.

11. The method as recited in claim 10, further comprising, by the first device, augmenting the second image data to change an appearance of the second real image.

12. The method as recited in claim 10, further comprising, by the first device, augmenting the first image data to change an appearance of the first real image.

13. The method as recited in claim 10, further comprising, by the first device:
- receiving first audio data from the second device;
- sending the first audio data to the fourth device;
- receiving second audio data from the fourth device, where the second audio data relates to the first audio data; and
- sending the second audio data to the second device.

14. The method as recited in claim 10, further comprising, by the first device, augmenting the second image data based on instructions stored in a memory of the first device.

15. The method as recited in claim 10, further comprising, by the first device, augmenting the first image data based on instructions stored in a memory of the first device.

16. The method as recited in claim 10, wherein the fourth device image is a first fourth device image, the second real image includes a second fourth device image that relates to the fourth device, and the first device is effective to augment the second fourth device image to change an appearance of the second fourth device image.

17. The method as recited in claim 10, further comprising, by the first device, sending the second image data to the second device base on receipt of a request from the second device to receive the second image data from the third device.

18. A first device effective to send data to a second device, the first device comprising:
- a processor; and
- a memory in communication with the processor;
- wherein the processor is effective to:
  - receive first image data from a third device, the first image data being based on a first real image, wherein first real image includes a fourth device image that relates to a fourth device;
  - send a request to the fourth device to receive second image data;
  - receive second image data from the fourth device, the second image data being based on a second real image;
  - receive first audio data from the second device;
  - send the first image data to the second device;
  - send the first audio data to the fourth device;
  - receive second audio data from the fourth device, where the second audio data relates to the first audio data;
  - send the second audio data to the second device; and
  - send the second image data to the second device.

19. The device as recited in claim 18, wherein the processor is effective to augment the second image data to change an appearance of the second real image.

20. The device as recited in claim 18, wherein the processor is effective to augment the first image data to change an appearance of the first real image.

* * * * *